United States Patent [19]

Baker

[11] Patent Number: 4,913,509
[45] Date of Patent: Apr. 3, 1990

[54] FAIL-SAFE PORT FOR USE WITH AN OPTICAL FIBER

[75] Inventor: Anthony P. Baker, New York, N.Y.

[73] Assignee: ITT Corporation, New York, N.Y.

[21] Appl. No.: 795,296

[22] Filed: Nov. 5, 1985

[51] Int. Cl.$^4$ ................................................. G02B 6/28
[52] U.S. Cl. ............................ 350/96.16; 350/96.13;
350/96.15; 350/347 R; 350/347 E; 350/347 V
[58] Field of Search .............. 350/96.13, 96.14, 96.15,
350/96.16, 342, 347 E, 347 V, 331 R; 455/606,
607, 612; 340/805

[56] References Cited

U.S. PATENT DOCUMENTS

| | | | |
|---|---|---|---|
| 4,137,523 | 1/1979 | Mukaiyama | 340/805 X |
| 4,269,511 | 5/1981 | Erwin | 350/331 R X |
| 4,278,327 | 7/1981 | McMahon et al. | 350/96.14 X |
| 4,478,494 | 10/1984 | Soref | 350/347 E X |

FOREIGN PATENT DOCUMENTS 0189732  9/1985  Japan ........................ 350/96.14

*Primary Examiner*—William L. Sikes
*Assistant Examiner*—John Ngo
*Attorney, Agent, or Firm*—Thomas N. Twomey; Mary C. Werner

[57] ABSTRACT

A fail-safe port apparatus includes a low loss liquid crystal optical switching device providing first and second light paths, the first path providing a failure, or default, mode path and the second path providing an operating mode.

5 Claims, 2 Drawing Sheets

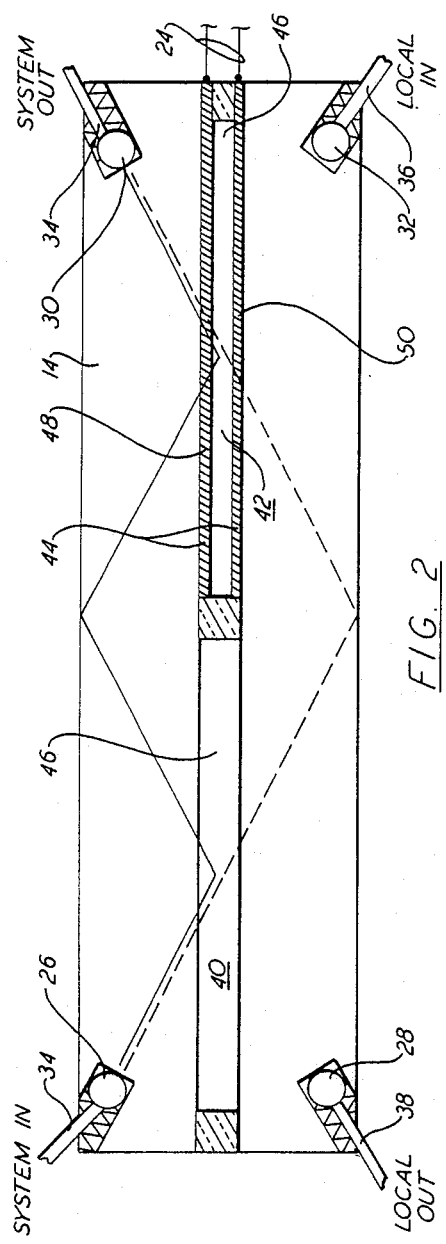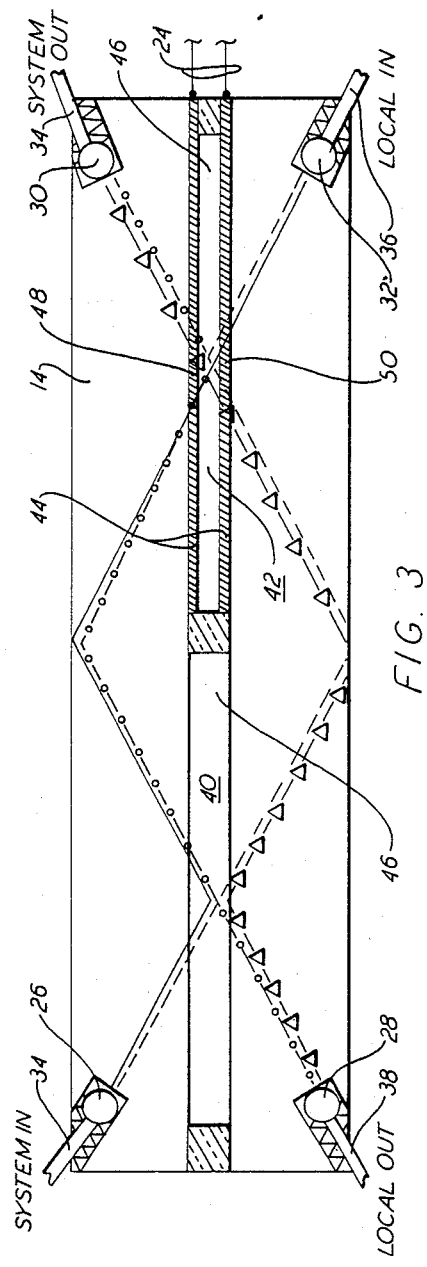

FAIL-SAFE PORT FOR USE WITH AN OPTICAL FIBER

CROSS-REFERENCE TO RELATED APPLICATIONS

This application is related to one, or more, of the following U.S. patent applications: Ser. No. 795,156; Ser. No. 795,151; Ser. No. 595,150; Ser. No. 795,154; Ser. No. 795,155; Ser. No. 795,138; Ser. No. 795,148; Ser. No. 795,157; Ser. No. 795,152; Ser. No. 795,149 all filed on even date herewith. All of the above applications are assigned to the assignee hereof.

BACKGROUND OF THE INVENTION

The present invention generally relates to a fail-safe port apparatus for use with an optical fiber and, in particular, relates to one such port apparatus having means, employing a liquid crystal material, for switching a light beam between first and second light paths such that losses are minimized.

Currently, many communications systems are being implemented using optical fibers as the primary system transmission medium. Such applications are most frequently directed to communications networks that are local in nature, such as, for example, a local area network (LAN). As known, a LAN is, essentially, a communication network particularly adapted for providing networking facilities to a relatively small geographical area, for example, a corporate or university facility. One major difference between, for example, a long distance communication network and a local area network, at least with respect to the use of optical fibers, is that the long distance network usually requires a comparatively high powered laser, whereas a local area network can operate by use of a comparatively low powered light emitting diode transmitter. Nevertheless, in optical local area networks, in order to avoid the use of the expensive high power lasers and enhance the use of less expensive low power light emitting diodes, the light signal is usually regenerated along the network to compensate for losses due to the signal attenuation in the optical fiber and associated hardware. Frequently, a signal regenerator is provided at each local area network access port.

At the present time, access to such ports is most frequently accomplished by means of a directional coupler that, in essence, includes a local port receiving fiber fused to the primary, or system, transmission optical fiber and connected to a light receiver. One difficulty with such optical couplers is that considerable losses are sustained by signals traversing thereacross. Characteristically, each such coupler can introduce between 3 to 8 db loss. Hence, in typical local area networks the optical signals need to be regenerated along the transmission medium, usually at each port. However, if a failure occurs at one or more consecutive ports along the transmission fiber, or if a number of consecutive ports are unused, the signal strength rapidly decreases. This signal strength loss occurs because the coupler loss occurs regardless of whether or not the port is active. Further, in the event of a port failure it is possible, since the coupler remains in the transmission medium, for signal reflections to be generated and thus reduce the purity of the signal on the system optical fiber.

Alternatively, the need for signal regeneration may be reduced by providing fewer ports per fiber and/or increasing the signal strength. Nevertheless, optical directional couplers are generally considered necessary to provide a fail-safe mechanism for interconnecting to the system optical fiber transmission line. By fail-safe, it is meant that, should a local occurrence at the port result in a failure threat, the remainder of the ports coupled to the main transmission medium would be substantially unaffected. This is necessitated to avoid a catastrophic system failure due to a purely local failure event.

Consequently, it is highly desirable to provide a low loss fail-safe port for interfacing with the system optical fiber transmission medium of an optical communication network, such as, an optical local area network.

SUMMARY OF THE INVENTION

Accordingly, it is one object of the present invention to provide a low loss fail-safe port for use with an optical transmission medium.

This object is accomplished, at least in part, by a low loss fail-safe port apparatus having means, employing a liquid crystal material, for selectively switching a light signal through a local port.

Other objects and advantages will become apparent to those skilled in the art from the following detailed description read in conjunction with the appended claims and the drawings attached hereto.

BRIEF DESCRIPTION OF THE DRAWINGS

FIGS. 2 and 3 are light ray diagrams of a liquid crystal optical switching device particularly useful with the fail-safe port shown in FIG. 1.

DETAILED DESCRIPTION OF THE INVENTION

Figure 1:
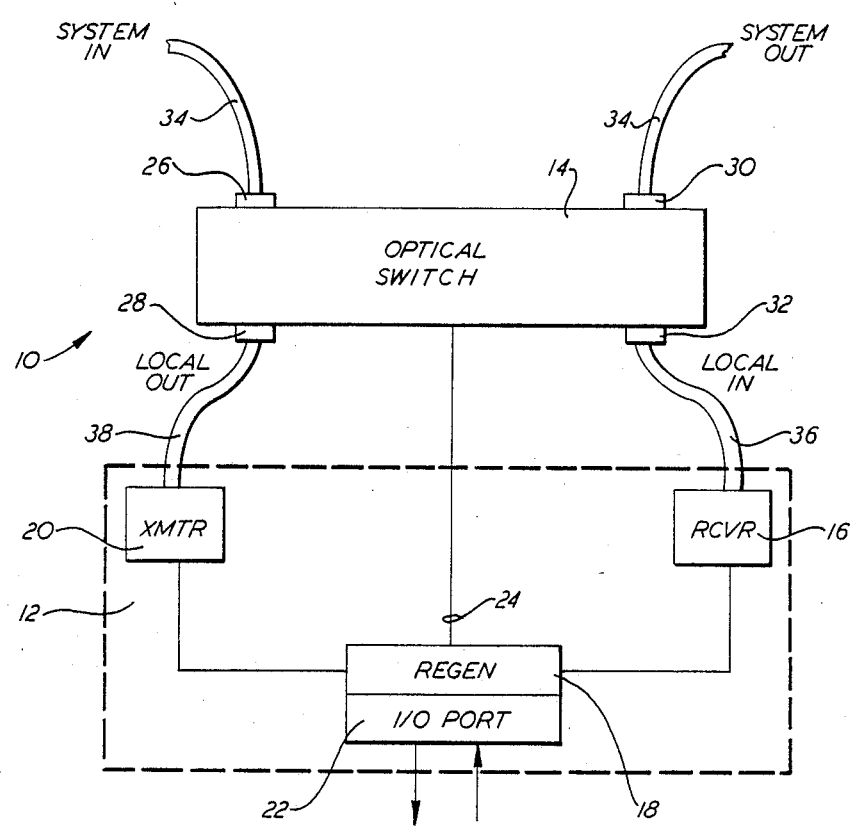
FIG. 1 is a block diagram of a fail-safe port, not drawn to scale, embodying the principles of the present invention.

An apparatus, generally indicated at 10 in FIG. 1 and embodying the principles of the present invention, includes a subscriber port interface 12 and a liquid crystal optical switching device 14.

In one embodiment, the subscriber port interface 12 includes means 16 for receiving a light signal from the liquid crystal optical switching device 14, means 18 for regenerating a signal, means 20 for transmitting a light signal to the liquid crystal optical switching device 14 and means 22 for establishing bidirectional communication with a subscriber. Preferably, the port interface 12 further includes means 24 for controlling the state of the liquid crystal optical switching device 14. In such an embodiment, the liquid crystal optical switching device 14 includes first and second input ports, 26 and 28, respectively, and first and second output ports, 30 and 32, respectively. The first input and first output ports, 26 and 30, respectively, are, preferably, serially introduced into a system optical fiber transmission path 34. The second output port 32 of the device 14 is connected to the means 16 for receiving an optical signal and the second input port 28 is connected to the means 20 for transmitting an optical signal.

In one specific implementation, the means 16 for receiving a light signal preferably includes a photodiode receiver, such as, for example, a device employing a P-I-N or avalanche diode that converts the incident light signal from the second output port 32 to an electrical signal. Further, the means 20 for transmitting a light signal includes an electro-optic transducer, such as, for example, a light emitting diode, preferably having a launch power on the order of about −12 dbm. The light signal receiving means 16 and the light signal transmitting means 20 are generally known devices in the optical communication field and can be selected based on system parameters such as, optical operating frequency, power required, size limitations, and the like. In any event, the receiver means 16 converts an incoming information carrying light signal to an electrical signal carrying that information. Similarly, the transmitting means 20 converts an electrical information carrying signal to a light signal carrying that information.

The second output port 32 of the liquid crystal optical switching device 14 is connected to the receive side of the port interface 12 and the second input port 28 is connected to the transmit side thereof. These interconnects are preferably implemented via optical fiber lengths, 36 and 38, respectively.

The port interface 12 also includes the regenerator 18 that, regardless of whether or not an external subscriber or subscribers are actually connected to the port interface 12, regenerates, i.e., amplifies, the signal received, thereby compensating for signal strength losses in the liquid crystal optical switching device 14 and the connections associated therewith and the system optical fiber 34.

Preferably, the port interface 12 provides the necessary communication protocol conversions required for providing, for example, the Level 1 and 2 services as recommended by the International Standards Organization reference model of Open System Interconnection (ISO-OSI) and a power supply.

In one preferred embodiment, the liquid crystal optical switching device 14 is of the type discussed and described in U.S. patent application Ser. Nos. 795,156 and 795,157 entitled LIQUID CRYSTAL OPTICAL SWITCHING DEVICE HAVING REDUCED CROSSTALK and OPTICAL SWITCHING DEVICE, both filed on even date herewith and assigned to the assignee hereof. The above identified applications are deemed incorporated herein by reference. In one preferred embodiment, the voltage supplied to the liquid crystal optical switching device 14 from the port interface 12 is on the order of about 5 volts A.C. at a frequency in the range of 500 to 1,000 Hertz.

In one particular embodiment, the liquid crystal optical switching device 14 includes a means 40 for splitting an incident beam into polarized components and means 42 for switching the recombined components between the first and second output ports, 30 and 32, respectively. The means 42 for switching the components, preferably, includes means 44 for sustaining an electromagnetic field in a liquid crystal material 46. In general, the means 44 for sustaining an electromagnetic field in the liquid crystal material 46 of the switching means 42 includes first and second electrodes, 48 and 50, respectively. The electrodes, 48 and 50, are powered by the means 24 for controlling the state of the liquid crystal optical switching device 14. The means 24 can include any known failure detection mechanism that, upon detection of a port malfunction, removes the voltage from the electrodes, 48 and 50. For example, the means 24 can include a voltage comparator that, when the port voltage is outside a preselected operating range, removes the voltage from the electrodes, 48 and 50.

With particular reference to FIG. 2, a typical liquid crystal optical switching device 14 is shown for the condition where the subscriber input/output port interface 12 is either unused or in a default mode due to a local failure. As shown therein, the incident light beam from the system optical fiber transmission path 34 is split by the means 40 for splitting an incident light beam and recombined in the switching means 42 and since, the electrodes, 48 and 50, are unpowered and no electromagnetic field is sustained in the liquid crystal material 46, exit via the first output port 30 back to the system optical fiber transmission path 34. As used in FIGS. 2 and 3, the solid line indicates the parallel polarized component of the incident light beam that is reflected at the beam splitter means 40 and the switching means 42 in the unpowered mode, whereas the dashed line indicates a perpendicularly polarized component that is transmitted through the liquid crystal material 46 of both the beam splitter 40 and the switching means 42 in the unpowered mode.

Referring now to FIG. 3 wherein the subscriber port interface 12 is operative, the incident light enters via the first input port 26 in a fashion similar to that shown in FIG. 2. However, since the electrodes, 48 and 50, are powered the recombined incident light beam exits via the local input, i.e., the second output port 32, of the device 14. The local transmission or the regenerated light beam signal is incident on the means 40 for splitting a light beam via the second input port 28 from the means 20 for transmitting a light signal 20. As used herein the triangled line represents the parallel polarized portion of the retransmitted beam and the circled line represents the perpendicularly polarized portion thereof. Consequently, in the means for switching a light beam, the retransmitted light beam from the second input port 28 is directed, in the powered mode, to the first output port 30 and thus injected onto the system optical fiber transmission path 34. It is understood that to avoid signal mixing and excessive cross-talk, the subscriber port arrangement and the communication network are cooperatively operated such that the port 12 is either in a receive mode or in a transmit mode and is thus not able to transmit an optical signal into the device 14 simultaneously with a light signal from the system optical fiber 34 being received.

The liquid crystal optical switching device 14 can be implemented utilizing a molded plastic encasement having the liquid crystal optical switching device 14 contained therein. Alternatively the entire fail-safe port apparatus 10, i.e., the optical switch 14 and the port interface 12, can be fabricated utilizing, for example, known thin film semiconductor techniques whereby the fail-safe port apparatus 10 can be provided on a single semiconductor chip.

The primary advantage of the present fail-safe optical port apparatus 10 is that in the event of any failure at the port interface 12, the voltage to the liquid crystal optical switching device 14 is removed, whereupon the liquid crystal optical switching device 14 reverts to a default mode to provide a low loss path along the optical fiber transmission medium 34. Consequently, if any particular port 22 is either not used or malfunctions, the remainder of the system is substantially unaffected. Further, regardless of whether a port 22 is used or not the apparatus 10 reduces the magnitude of the signal loss conventionally associated with an optical system.

Although the present invention has been described with respect to a specific embodiment, it will be understood that other arrangements or configurations may be developed that, nevertheless, do not depart from the spirit and scope of the present invention. Hence, the present invention is deemed limited only by the appended claims and the reasonable interpretation thereof.

What is claimed is:

1. A fail-safe port apparatus comprises:
   a subscriber port interface comprising a signal regeneration means;
   a liquid crystal optical switching device, wherein said liquid crystal optical switching device includes:
   a first input port, said first input port communicating with an optical transmission medium;
   a first output port, said first output port communicating with said optical transmission medium;
   a second output port, said second output port communicating with said subscriber port interface; and
   a second input port, said second input port communicating with said subscriber port interface;
   said liquid crystal optical switching device being adapted to selectively switch light signals received from said optical transmission medium at said first input port to said signal regeneration means of said subscriber port interface via said second output port when said switch is in a power on condition, and wherein a light signal provided by said signal regeneration means to said second input port is directed to said optical transmission medium via said first output port when said switch is in a power on condition, and
   wherein said light signals received at said first input port pass through said switch and exit via said first output port when said switch is in a power off condition, and means for sustaining an electromagnetic field when said switch is in a power on condition in a liquid crystal material, said electromagnetic field sustaining means including first and second spaced apart electrodes.

2. Apparatus as claimed in claim 1 further comprising:
   means, associated with said subscriber port interface, for providing a voltage potential to said electrodes whereby a light signal from said optical transmission medium communicate with said subscriber port interface via said second output port.

3. Apparatus as claimed in claim 1 wherein said liquid crystal optical switching device further comprises:
   means for splitting a light beam into the polarization components thereof.

4. Apparatus as claimed in claim 3 wherein said light beam splitting means includes:
   liquid crystal material disposed in the path of light signals entering said liquid crystal optical switching device by either said first or said second input port.

5. A fail-safe port apparatus comprises:
   a subscriber port interface comprising a signal regeneration means
   and means for controlling the state of said switching means of said liquid crystal optical switching device;
   a liquid crystal optical switching device, wherein said liquid crystal optical switching device includes;
   a first input port, said first input port communicating with an optical transmission medium;
   first output port, said first output port communicating with an optical transmission medium;
   a second output port, said second output port communicating with said subscriber port interface; and
   a second input port, said second input port communicating with said subscriber port interface:
   said liquid crystal optical switching device being adapted to selectively switch light signals received from said optical transmission medium at said first input port to said signal regeneration means of said subscriber port interface via said second output port when said switch is in a power on condition, and wherein a light signal provided by said signal regeneration means to said second input port is directed to said optical transmission medium via said first output port when said switch is in a power on condition, and wherein said light signals received at said first input port pass through said switch and exit via said first output port when said switch is in a power off condition, and means for sustaining a electromagnetic field when said switch is in a power on condition in a
   liquid crystal material, said electromagnetic field sustaining means including first and second space apart electrodes.

* * * * *